United States Patent [19]
Swynford-Lain

[11] 3,849,776

[45] Nov. 19, 1974

[54] VIDEO TAPE RECORDERS FOR RECORDING PLURAL RADAR INFORMATION SOURCES ON A SINGLE TRACK

[75] Inventor: Richard Swynford-Lain, Earley, England

[73] Assignee: Ferranti Limited, Hollinwood, England

[22] Filed: Oct. 18, 1972

[21] Appl. No.: 298,516

[30] Foreign Application Priority Data

Oct. 20, 1971 Great Britain .................... 48701/74

[52] U.S. Cl. ...................... 343/5 PC, 360/18, 360/33

[51] Int. Cl. ............................ G01s 9/00, G11b 5/00

[58] Field of Search ........ 343/5 PC; 179/100.2 MD, 179/100.4 ST

[56] References Cited

UNITED STATES PATENTS

| | | | |
|---|---|---|---|
| 2,378,383 | 6/1945 | Arndt, Jr. | 179/100.2 MD |
| 2,840,800 | 6/1958 | Chester | 179/100.2 MD |
| 2,944,113 | 7/1960 | Wehde et al. | 179/100.2 MD |
| 3,181,133 | 4/1965 | Seitner | 179/100.2 MD |
| 3,287,505 | 11/1966 | Fukamachi | 179/100.2 MD |
| 3,634,887 | 1/1972 | Buchholz et al. | 343/5 PC |
| 3,725,912 | 4/1973 | Buchholz et al. | 343/5 PC |
| R27,734 | 10/1973 | Warren | 179/100.2 MD |

*Primary Examiner*—Maynard R. Wilbur
*Assistant Examiner*—G. E. Montone
*Attorney, Agent, or Firm*—Cameron, Kerkam, Sutton, Stowell & Stowell

[57] ABSTRACT

A tape recorder for recording video display information originating simultaneously from a number of sources comprises record signal processing means for suitably combining the various signals, means for recording or retrieving the information on magnetic tape, and playback signal processing means for separating the various signals.

20 Claims, 4 Drawing Figures

VIDEO TAPE RECORDERS FOR RECORDING PLURAL RADAR INFORMATION SOURCES ON A SINGLE TRACK

This invention relates to video tape recorders, and particularly to such recorders for recording and replaying video display information originating simultaneously from a plurality of sources.

The recording of video display information by means of a video tape recorder is a technique being used to an increasing extent in situations where the information is required to be stored for use or study at a later time. Recorders are known for use with radar systems in which the video, bearing and marker information may all be recorded on the video track of the recording tape. However, such a system is only able to record the information from a single source on one video track, owing to the bandwidth of the signals recording such information.

In applications such as those existing at commercial airfields, for example, there may well be more than one radar installation providing information about the same airspace, and hence it may be necessary to record the separate display information provided by two or more separate radars. Hitherto this has only been possible by using a similar number of recorders, though this has introduced synchronisation problems on playback. Recorders are known using tape having several video tracks, but these are much more expensive than a single-track recorder.

It is an object of the present invention to provide a video tape recorder for recording and replaying video display information originating simultaneously from a plurality of radar sources on a single video track of a recording medium.

According to the present invention there is provided a video tape recorder for recording and replaying video display information originating simultaneously from up to three sources and represented by separate video display information signals, which includes record signal processing apparatus comprising first carrier generating means operable to generate two carrier signals of the same frequency but in quadrature with one another, modulating means operable to modulate the two carrier signals with first and second video display information signals respectively, and combining means operable to combine the two modulated signals with the third video display information signal to form a composite signal; apparatus for causing the composite signal to be recorded on to or retrieved from a single video track of a magnetic recording medium; and playback signal processing apparatus comprising signal separating means operable to separate the said third video display information signal in said composite signal from the two modulated signals, second carrier generating means operable to generate two carrier signals of the same frequency as the carrier signals generated by the first carrier generating means but in quadrature with one another, and demodulating means operable to demodulate said two modulated signals to derive the first and second video display information signals.

An embodiment of the invention will now be described with reference to the accompanying drawings, and illustrates a recorder for recording and replaying radar display information.

In the drawings:-

The drawings and the following description relate to a radar recorder arranged to record the display information from three separate sources on to a single video track of a recording tape, whilst the audio, bearing and marker information is recorded on to the usual two audio tracks.

Figure 1:
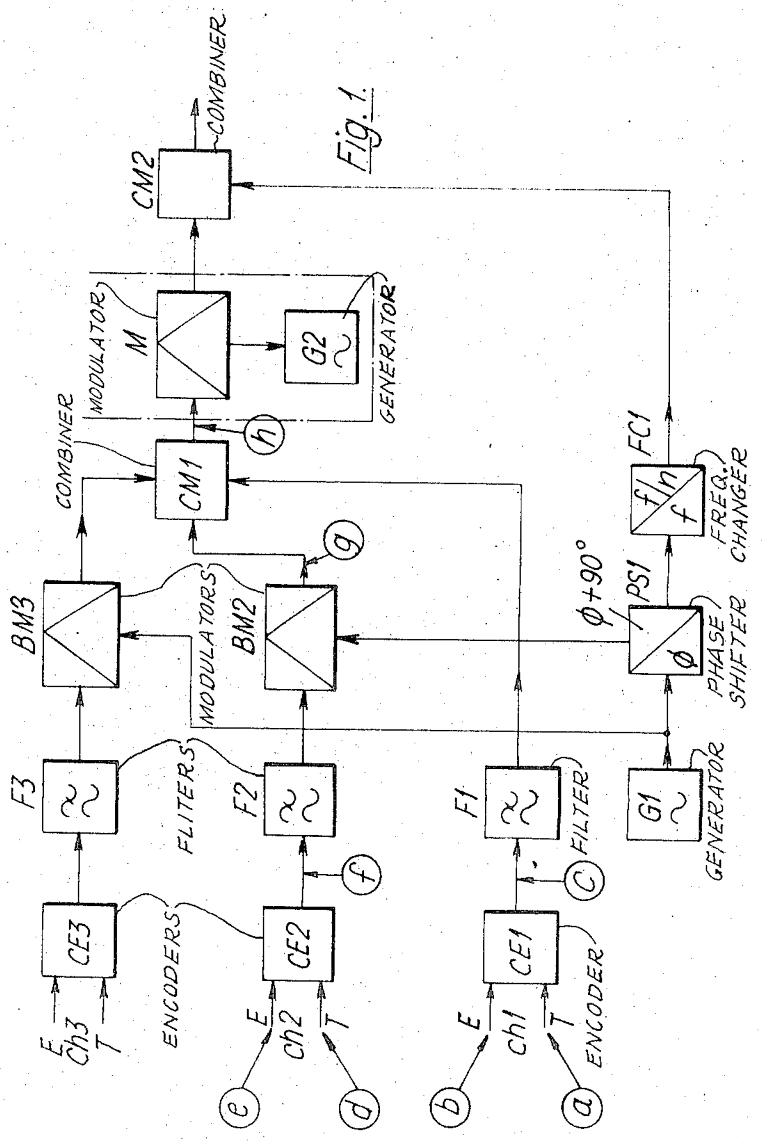
FIG. 1 is a schematic block diagram of the record signal processor.

Referring now to FIG. 1, the record signal processor has three input channels, each being supplied with signals (T) representative of the transmitter pulses of the radar, and echo signals (E) from the radar receiver. The signals for each channel are applied to respective channel encoders CE1, CE2 and CE3 respectively to form encoded signals. From each channel encoder these encoded signals pass through low-pass filters F1, F2 and F3 respectively. The output of filter F2 is applied to the modulation signal input of a balanced modulator BM2, whilst the output of filter F3 is similarly applied to a balanced modulator BM3.

A sine-wave generator G1 is used to generate a carrier signal of frequency $f$. This signal is applied to the carrier signal input of balanced modulator BM3 and, via a 90° phase-shifting network PS1, to the carrier signal input of balanced modulator BM2. The generator G1 and phase-shifting network PS1 form the first carrier generating means. The outputs of the two balanced modulators and the output of filter F1 are additively combined in a combiner CM1 and the output of the combiner is applied to the modulating signal input of a conventional frequency-modulation modulator M, as in a conventional video tape recorder. The modulator M has its own carrier-signal generator G2. The frequency-modulated output of modulator M is combined with a pilot carrier of frequency $f/n$, derived from generator G1 via phase-shifter PS1 and a frequency-changer FC1, in a second combining stage CM2, and the output of this is applied to the recording heads of the recorder.

The operation of the record signal processor of FIG. 1 will now be described with reference to the waveforms of FIG. 2.

Figure 2:
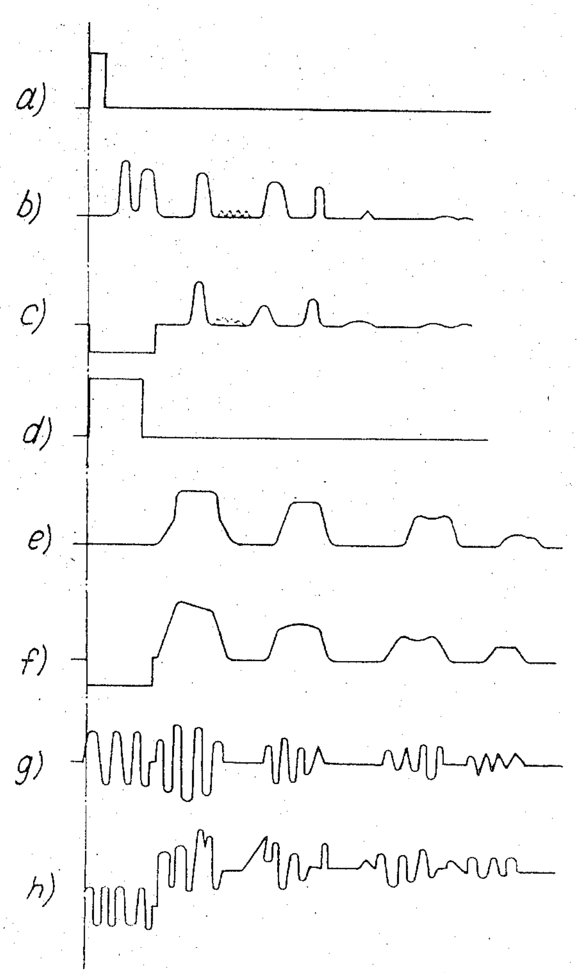
FIG. 2 shows a series of waveforms representing the signals occuring during the operation of the record signal processor of FIG. 1.

FIGS. 2(*a*) and 2(*b*) represent respectively the transmitter (T) and echo (E) signal inputs to channel 1, and FIG. 2(*c*) represents the form of the encoded signal output from the corresponding channel encoder CE1. The channel encoder inverts the transmitter pulse and, if necessary, lengthens it, to ensure that satisfactory DC restoration may take place in the actual recorder. This may result in the removal of the first echo pulses, but as these will only be ground return echos this is not important.

Channels 2 and 3 are treated in a similar manner, the corresponding signals for channel 2 being shown in FIGS. 2(*d*), 2(*e*) and 2(*f*). The three source radars may produce echo returns of completely different form, depending upon the type and range of the radar systems.

The bandwidths of the encoded signals are determined by the low-pass filters F1, F2 and F3, and the filters may be of different characteristics to produce outputs of different bandwidth if required.

For the purpose of this description it is assumed that there is no input to channel 3, in order to simplify the appearance of some of the waveforms of FIG. 2.

The channel 2 frequency-restricted encoded signal is modulated in modulator BM2, the form of the output of which is shown in FIG. 2(*g*). A similar output would be obtained from the channel 3 modulator BM3 if an input was present, except that the carrier signal would be in quadrature with that of modulator BM2. The two modulator outputs are combined with the frequency-restricted encoded signal on channel 1 to obtain from combiner CM1 a signal of the form shown in FIG. 2(*h*). As already stated this is subjected to the normal frequency-modulating process used in video recorder, and has the pilot carrier of frequency *f/n* added to it before being recorded on to the recording tape.

By way of example only, the carrier generator G may operate at 3.5 MHz, with the pilot carrier being divided down to 1MHz. The fm modulator M may operate over the range 5.5 to 6.6 MHz.

Figure 3:
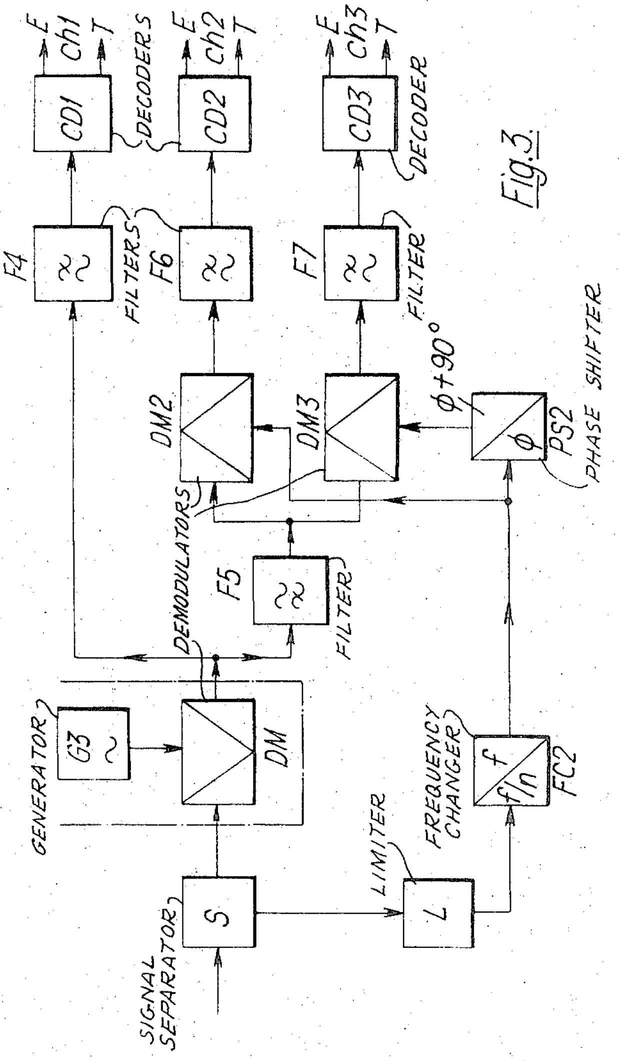
FIG. 3 is a block diagram of the playback signal processor.

The playback signal processor necessary to retrieve the original signals is shown in FIG. 3, and performs the reverse of the process used by the record signal processor. The composite signal from the playback heads of the recorder is applied to a signal separator S in the form of a tuned amplifier. The pilot carrier is extracted and the remaining signal is demodulated in the usual FM demodulator DM used in a video recorder. The necessary carrier signal is produced by generator G3. The output of the demodulator is passed to filters F4 and F5, F4 being a low-pass filter and F5 being a high-pass filter. The output of filter F4 is passed to the channel 1 decoder CD1, from which are obtained the transmitter (T) and echo (E) pulses for channel 1. The output of high-pass filter F5 is applied to the signal inputs of two synchronous demodulators DM2 and DM3.

The pilot carrier obtained from the signal separator S is passed to second carrier generating means comprising a limiter L and a frequency-changer F2 from which a carrier signal of the original frequency *f* is obtained. This is applied direct to the carrier signal input of demodulator DM2 and to a 90° phase-shifting network PS2. The output of the phase-shifting network is applied to the carrier signal input of the other demodulator DM3. The demodulated outputs of the two synchronous demodulators DM2 and DM3 are passed via low-pass filters F6 and F7 respectively to the respective channel 2 and channel 3 decoders CD2 and CD3, from which the required transmitter and echo signals are produced for application to, say, display devices. It is assumed that the phase-shift produced by network PS2 is in the same sense as that produced by record network PS1.

The operation of the playback signal processor is self-explanatory and will not be described further.

Figure 4:
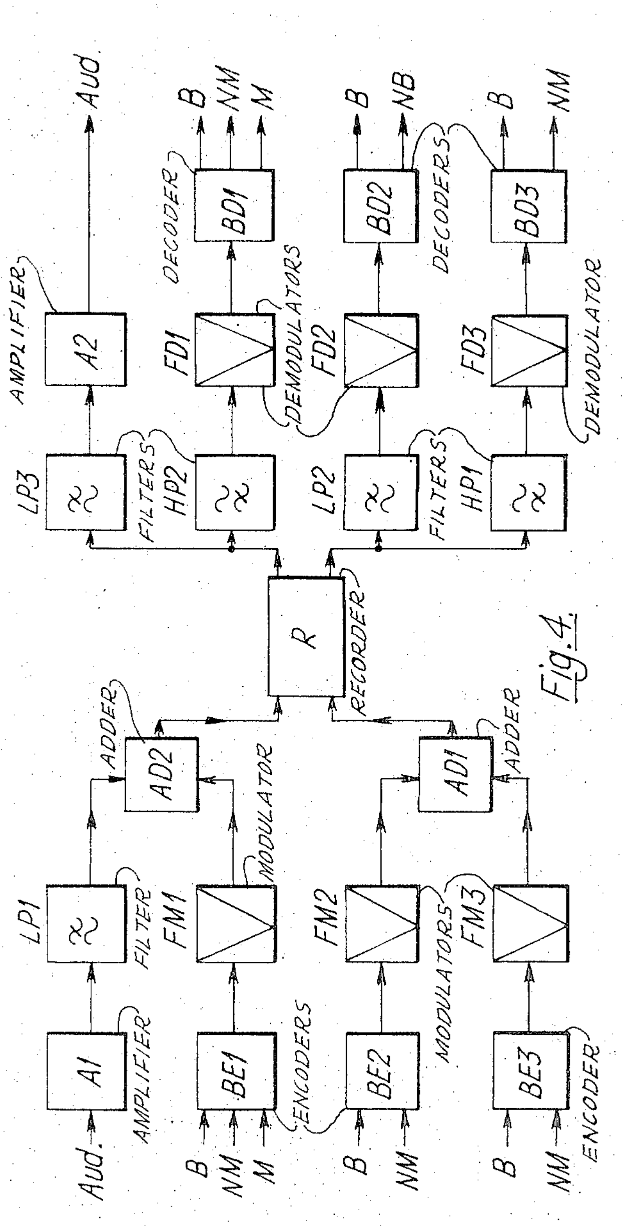
FIG. 4 is a block diagram of the means for recording and replaying audio, bearing and marker information.

As well as recording the video display information for each input channel, other data also has to be recorded. The movements of each radar antenna have to be recorded so that the replayed information may be displayed in the correct position on the screen, and hence bearing data (in the case of rotating antennae) has to be recorded. Similarly various markers will have to be recorded, such as North or heading markers. In addition there may well be a voice channel to record, such as a commentary or a controllers speech circuit. FIG. 4 illustrates a method for recording all this data for the three input channels previously considered.

The bearing data representing antenna angular position for each channel is applied to a bearing encoder BE1, BE2 or BE3, together with the appropriate markers. The encoders convert the bearing data into a train of pulses of constant amplitude representing bearing increments.

The markers are represented by pulses of greater amplitude. The encoded data from the channels is then passed to fm modulators FM1, FM2 and FM3 respectively, the channel 2 and channel 3 modulators being arranged to use different carrier frequencies so that their outputs may be combined in the adder AD1 without interfering with one another. The output of the adder is applied to one of the two audio input channels on the recorder R to be recorded on one audio track of the recording tape.

The channel 1 bearing and marker data is also passed from the modulator to a second adder AD2 where it is combined with the audio input. This latter input is amplified by a pre-amplifier A1, then restricted by a low-pass filter LP1 to a frequency band separate from that occupied by the output from the modulator FM1. The output from the adder AD2 is applied to the second audio input of the recorder R for recording on the other audio track of the recording tape.

On playback, the output from the first audio track contains the channel 2 and channel 3 bearing and marker data. The two channels are separated by the use of a high-pass filter HP1 and a low-pass filter LP2, the outputs of which are fed to two fm demodulators FD2 and FD3 respectively. The output from the other audio track contains the channel 1 bearing and marker data and the audio or speech output. The two are separated by a high-pass filter HP2 and a low-pass filter LP3. The signal from the high-pass filter is applied to a demodulator FD1. The low-frequency signals are the audio output which are applied to an audio-frequency amplifier.

The output from each demodulator is passed to a separate bearing decoder BD1, BD2 and BD3. Each of these uses a counter to which are applied the bearing increments in order to obtain a datum, the counters being reset by each north or desired heading marker. The bearing data outputs may be pulse outputs for a stepping motor or continuous signals representing antenna angular position.

The apparatus described above is, as already stated, for the recording and playback of radar display information from three separate sources. If one or two of the video display information signals are absent at any particular time the apparatus will still function correctly.

The above description relates to a recorder for radar display information. The recorder may be used in a similar manner to record other types of video display information signal, such as signals representing display signals from data terminals or the like.

The recorder carrier generators G2 and G3 used to provide carrier signals to the record modulator and playback demodulator respectively will, of course, usually be a single generator if the same machine is intended to operate in both record and playback modes.

What I claim is:

1. A video tape recorder for recording and replaying video display information originating simultaneously from up to three sources, and represented by separate video display information signals which includes record signal processing apparatus comprising first carrier generating means operable to generate two carrier signals of the same frequency but in quadrature with one another, modulating means operable to modulate the two carrier signals with first and second video display information signals respectively, and combining means operable to combine the two modulated signals with the third video display information signal to form a single video track of a composite signal; apparatus for causing the composite signal to be recorded on to or retrieved from a magnetic recording medium; and playback signal processing apparatus comprising signal separating means operable to separate the said third video display information signal in said composite signal from the two modulated signals, second carrier generating means operable to generate two carrier signals of the same frequency as the carrier signals generated by the first carrier generating means but in quadrature with one another, and demodulating means operable to demodulate the two modulated signals to derive the first and second video display information signals.

2. A recorder as claimed in claim 1 for use where each source is a radar system and in which the record signal processing apparatus includes, for each source, encoding means operable to combine a signal representing a transmitted pulse with the corresponding received echo signals to form an encoded signal.

3. A recorder as claimed in claim 2 in which the record signal processing apparatus includes filter means operable to determine the bandwidth of each encoded signal.

4. A recorder as claimed in claim 1 in which the modulating means of the record signal processing apparatus comprises two balanced modulator circuits.

5. A recorder as claimed in claim 1 in which the record signal processing apparatus includes means for adding a pilot carrier signal to the said composite signal.

6. A recorder as claimed in claim 5 in which the pilot carrier signal is of lower frequency than the carrier signals generated by the carrier generating means.

7. A recorder as claimed in claim 1 in which the playback signal processing apparatus includes means for separating the pilot carrier from the recorded composite signal.

8. A recorder as claimed in claim 7 in which the second carrier generating means of the playback signal processing apparatus includes means for deriving from the pilot carrier two carrier signals in quadrature with one another.

9. A recorder as claimed in claim 1 in which the demodulating means of the playback signal processing apparatus comprises two synchronous demodulators.

10. A recorder as claimed in claim 1 in which the playback signal processing apparatus includes, for the signals from each separate source, decoding means operable to derive from such signals.

11. A recorder as claimed in claim 1 which includes means for recording and replaying signals representing bearing and marker information for each source.

12. Record signal processing apparatus for a video tape recorder for use with a recording medium having a single video track on which may be recorded video display information originating simultaneously from up to three sources and represented by separate video display information signals, which includes carrier generating means operable to generate two carrier signals of the same frequency but in quadrature with one another, modulating means operable to modulate the two carrier signals with first and second video display information signals respectively, and combining means operable to combine the two modulated signals with the third video display information signals.

13. Record signal processing apparatus as claimed in claim 12 for use where each source is a radar system which includes, for each source, encoding means operable to combine a signal representing a transmitted pulse with the corresponding received echo signals to form an encoded signal.

14. Record signal processing apparatus as claimed in claim 12 which includes filter means operable to determine the bandwidth of each encoded signal.

15. Record signal processing apparatus as claimed in claim 12 in which the modulating means comprises two balanced modulators.

16. Record signal processing apparatus as claimed in claim 12 which includes means for adding a pilot carrier signal to the said composite signal.

17. Record signal processing apparatus as claimed in claim 16 in which the pilot carrier signal is of lower frequency than the carrier signals generated by the carrier generating means.

18. Playback signal processing apparatus for a video tape recorder for use with a recording medium having a single video track on which may be recorded video display information originating simultaneously from up to three sources and represented by separate video display information signals which includes signal separating means operable to separate a third video display information signal from a composite signal representing three video display information signals, carrier generating means operable to generate two carrier signals of the same frequency but in quadrature with one another, and demodulating means operable to demodulate the remainder of the composite signal to derive first and second video display information signals.

19. Playback signal processing apparatus as claimed in claim 18 for use when each source is a radar system which includes, for each video display information signal, decoding means operable to obtain from such signal a signal representing a radar transmitter pulse and the corresponding received echo signals.

20. Playback signal processing apparatus as claimed in claim 18 in which the demodulating means comprise two synchronous demodulators.

* * * * *